C. C. HEARLE.
HYDRO-PNEUMATIC FIRE-EXTINGUISHERS.

No. 194,597. Patented Aug. 28, 1877.

WITNESSES:
C. Neveux
J. H. Scarborough

INVENTOR:
C. C. Hearle.
BY
ATTORNEYS.

UNITED STATES PATENT OFFICE.

CHARLES C. HEARLE, OF MONTREAL, QUEBEC, CANADA.

IMPROVEMENT IN HYDRO-PNEUMATIC FIRE-EXTINGUISHERS.

Specification forming part of Letters Patent No. 194,597, dated August 28, 1877; application filed June 18, 1877.

*To all whom it may concern:*

Be it known that I, CHARLES COPPIN HEARLE, of Montreal, in the Province of Quebec and Dominion of Canada, have invented a new and useful Improvement in Hydro-Pneumatic Fire-Extinguisher, of which the following is a specification:

This invention relates to portable fire-extinguishers, which are designed for throwing water by the elastic force of compressed air.

The nature of my invention and improvement consists in the combination of a reservoir for water, a reservoir for air, an air-tube, an air-check, and a detachable cock, as will be hereinafter described.

Figure 1:
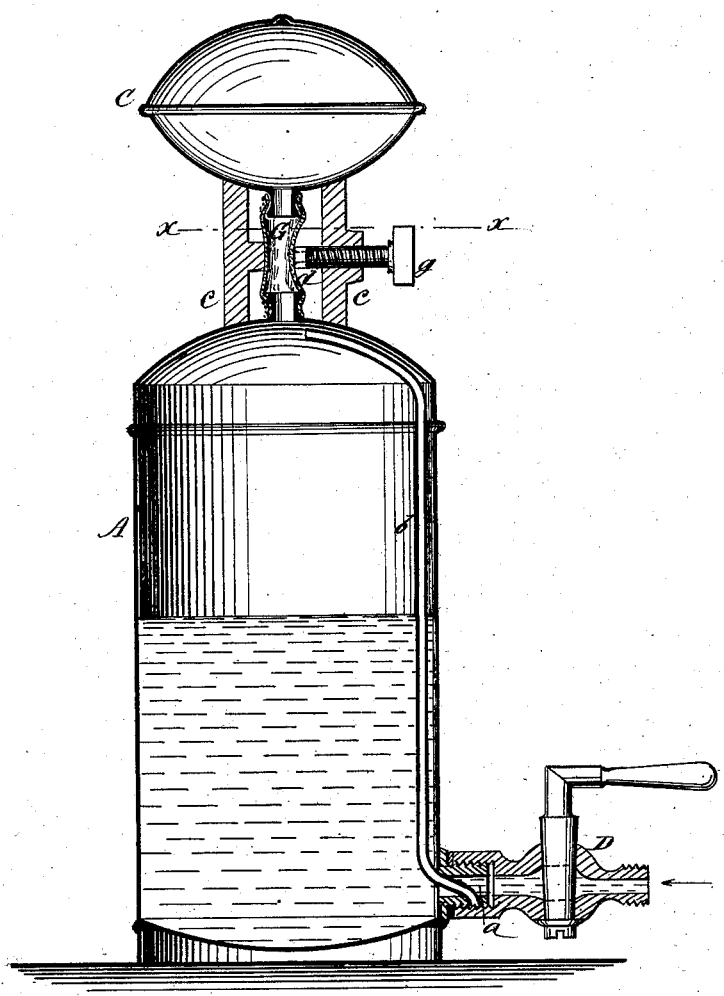
Figure 2:
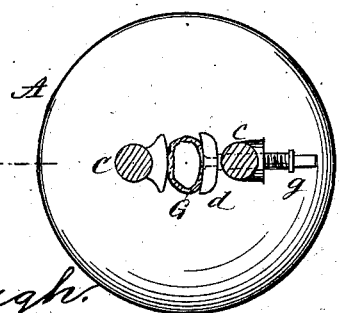

In the annexed drawing, Figure 1 is a diametrical section through the improved fire-extinguisher. Fig. 2 is a section taken horizontally through Fig. 1, indicated by dotted line $x\ x$ thereon.

Similar letters of reference indicate corresponding parts.

The vessel A is designed to contain water, and this vessel may be made of any desired size or shape, and suitable material. I prefer to construct it cylindrical, with a dome-shaped top, and to provide it with a screw-threaded tube, $a$, near its bottom for receiving a cock, D. The vessel A is also provided with an air-inlet tube, $b$, which is inserted through the tube $a$, and extended up to the highest point of the vessel A, as shown in Fig. 1. C designates an air-receiver, made of any suitable shape and material, and permanently secured to the vessel A by means of pillars $c\ c$. The air-receiver communicates with the interior of the water-receiver A by means of a strong air-tight tube, G, which lies against an abutment on one of the pillars $c$, and is compressed by a clamp, $d$, acted on by a thumb-screw, $g$, on the other pillar $c$. By tightly setting up the thumb-screw $g$ there will be no communication between the receivers A C, either for air or water. This air-check renders unnecessary the use of a valve or other device, which would be liable to derangement, and fail to operate at the time required.

Operation: Screw on the cock D a hose, which communicates with a hydrant or a force-pump. Open air-check G $g$ and cock D, and let the head of water on. The water rises in vessel A, and forces the air in it through tube G into vessel C. When vessel A is full of water, close tube G and take off cock D. Air will now flow into vessel A through tube $b$, and allow the water to flow freely out of this vessel, air taking its place. Communication is again established between the hydrant or force-pump and the vessel A, and the air-check G $g$ is again opened, allowing another charge of air to be forced into receiver C, after which the cock D is shut, hose removed from hydrant or force-pump, branch pipe put on, and the machine is ready for use.

In using the extinguisher, discharge all the water from vessel A, but as soon as, or just before, air begins to escape shut cock D, to prevent waste of compressed air.

After once fully charging the machine with air it will not be necessary to recharge it unless the contained air escapes by accident.

Besides its use as a fire-extinguisher, the machine can be made available for any purpose for which a stream of water is required, such as sprinkling lawns, gardens, &c.

Having thus described my invention, I claim as new and desire to secure by Letters Patent—

In combination with the vessel A and its cock D and air-tube $b$, the air-receiver C, flexible tube G, and clamping-screw $g$, the air-receiver being permanently secured to the water-receiver, substantially as described.

CHARLES COPPIN HEARLE.

Witnesses:
T. L. CLARK,
C. S. WANEN.